US011625309B1

(12) United States Patent
Chen

(10) Patent No.: US 11,625,309 B1
(45) Date of Patent: Apr. 11, 2023

(54) AUTOMATED WORKLOAD MONITORING BY STATISTICAL ANALYSIS OF LOGS

(71) Applicant: INTERNATIONAL BUSINESS MACHINES CORPORATION, Armonk, NY (US)

(72) Inventor: Hsiulan Chen, Beijing (CN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/515,539

(22) Filed: Oct. 31, 2021

(51) Int. Cl.
*G06F 11/00* (2006.01)
*G06F 11/30* (2006.01)
*G06F 11/34* (2006.01)
*G06F 40/40* (2020.01)
*G06F 11/36* (2006.01)

(52) U.S. Cl.
CPC ...... *G06F 11/3075* (2013.01); *G06F 11/3414* (2013.01); *G06F 11/3476* (2013.01); *G06F 11/3656* (2013.01); *G06F 40/40* (2020.01)

(58) Field of Classification Search
CPC ............ G06F 11/3476; G06F 11/0778; G06F 11/079; G06F 11/3072; G06F 11/30; G06F 11/0775; G06F 11/0766; G06F 11/0769; G06F 11/3414; G06F 11/3075
See application file for complete search history.

(56) References Cited

U.S. PATENT DOCUMENTS

| 10,318,387 | B1 * | 6/2019 | Chopra | ............... | G06F 11/1435 |
| 2018/0203757 | A1 * | 7/2018 | Akune | ............... | G06F 11/0784 |
| 2021/0157665 | A1 * | 5/2021 | Rallapalli | ............. | G06F 11/302 |
| 2022/0019954 | A1 * | 1/2022 | Andina Silva | ...... | G06F 11/0766 |

FOREIGN PATENT DOCUMENTS

| CN | 103986625 A | 8/2014 |
| WO | 2020177854 A1 | 9/2020 |

OTHER PUBLICATIONS

"Unified Logging for Microservices Applications"—Azure Example Scenarios | Microsoft Docs, 9 pgs.
Forsberg, Viktor, "Automatic Anomaly Detection and Root Cause Analysis for Microservice Clusters", Diva, 2019, 46 pgs.
(Continued)

*Primary Examiner* — Charles Ehne
(74) *Attorney, Agent, or Firm* — Erik Swanson; George Blasiak; Heslin Rothenberg Farley Mesiti P.C.

(57) ABSTRACT

Methods, computer program products, and systems are presented. The methods include, for instance: A plurality of log messages generated while an application processes two or more workloads are collected. The application is microservice-based and each of the microservices generates respective log messages. A time domain analysis is performed to lay out respective iteration counts of the microservices of the application. Keyword patterns in the log messages are compiled and stored in a keywords database. A frequency domain analysis on the keyword patterns for respective numbers of appearances in the log messages and stored in a frequency domain analysis database. Logs generated from a new workload are automatically monitored for abnormality by comparing the logs by the new workload to the statistical pattern of keywords as established by previous workloads. For a deviation greater than a threshold, an alert is generated with issue location and delivered to preselected recipients.

20 Claims, 8 Drawing Sheets

(56) References Cited

OTHER PUBLICATIONS

Hernández, Álvaro Brandón, et al., "Graph-based Root Cause Analysis for Service-Oriented and Microservice Architectures", Journal of Systems and Software, Oct. 2019, 28 pgs.

Du, Qingfeng, et al., "Anomaly Detection and Diagnosis for Container-based Microservices with Performance Monitoring", EasyChair, Aug. 30, 2018, 14 pgs.

Mell, Peter, et al., "The NIST Definition of Cloud Computing", NIST Special Publication 800-145, Sep. 2011, Gaithersburg, MD, 7 pgs.

* cited by examiner

AUTOMATED WORKLOAD MONITORING BY STATISTICAL ANALYSIS OF LOGS

TECHNICAL FIELD

The present disclosure relates to workload process monitoring, and more particularly to methods, computer program products, and systems for automated alerting of service abnormalities based on statistical analysis of keyword patterns in log messages generated by workloads.

BACKGROUND

In conventional service architectures, operations of applications are monitored based on pre-defined error codes or failure key words inserted into application programs, which is impractical to identify all errors and failures in a microservice-based service architecture due to the complexity of interactions amongst numerous microservice-based applications. A common service architecture based on microservices runs multiple application containers corresponding to respective microservices independently and asynchronously. In a microservice-based architecture, up to a few thousands of application containers often run concurrently. Microservices generate a significant number of log messages at respective locations along a predefined workflow. As multiple applications run asynchronously by design, a single application amongst many applications running inside an application container can function abnormally without affecting other applications in the same application container. Accordingly, noticing and resolving any issues of the applications in the microservice-based service architecture would require close monitoring and reviewing of the log messages. However, the log messages generated from the microservices are numerous and often in respective formats as defined by developers of the microservices, without any systemic rule for interpretation. The significant number and arbitrary formats of the log messages generated by the microservices make difficult monitoring health of the application containers by the log messages and thereby identifying and resolving any problems in the operations of the microservices.

SUMMARY

The shortcomings of the prior art are overcome, and additional advantages are provided, through the provision, in one aspect, of a method. The method includes, for instance: collecting, by one or more processor, a plurality of log messages generated while processing two or more workloads that had been successfully completed by an application, where a plurality of microservices of the application collectively generates the log messages; performing, by the one or more processor, a time domain analysis on the microservices for respective iteration counts of the microservices of the application, and building a time domain analysis database with a result of the time domain analysis; extracting, by the one or more processor, keyword patterns frequently used in the log messages by the microservices from collecting, and building a keywords database with the keyword patterns; performing, by the one or more processor, a frequency domain analysis on the keyword patterns for respective numbers of appearances in the log messages, and building a frequency domain analysis database with a result of the frequency domain analysis; obtaining, by the one or more processor, logs generated from a new workload for the application; determining, by the one or more processor, that the logs generated from the new workload has a deviation greater than a threshold set for the workloads for the application, based on comparing keyword patterns from the logs of the new workload against the keyword patterns in the frequency domain analysis database; and generating, by the one or more processor, an alert with a microservice originating an abnormality based on a specific keyword pattern corresponding to the deviation and delivering the alert to preselected recipients.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
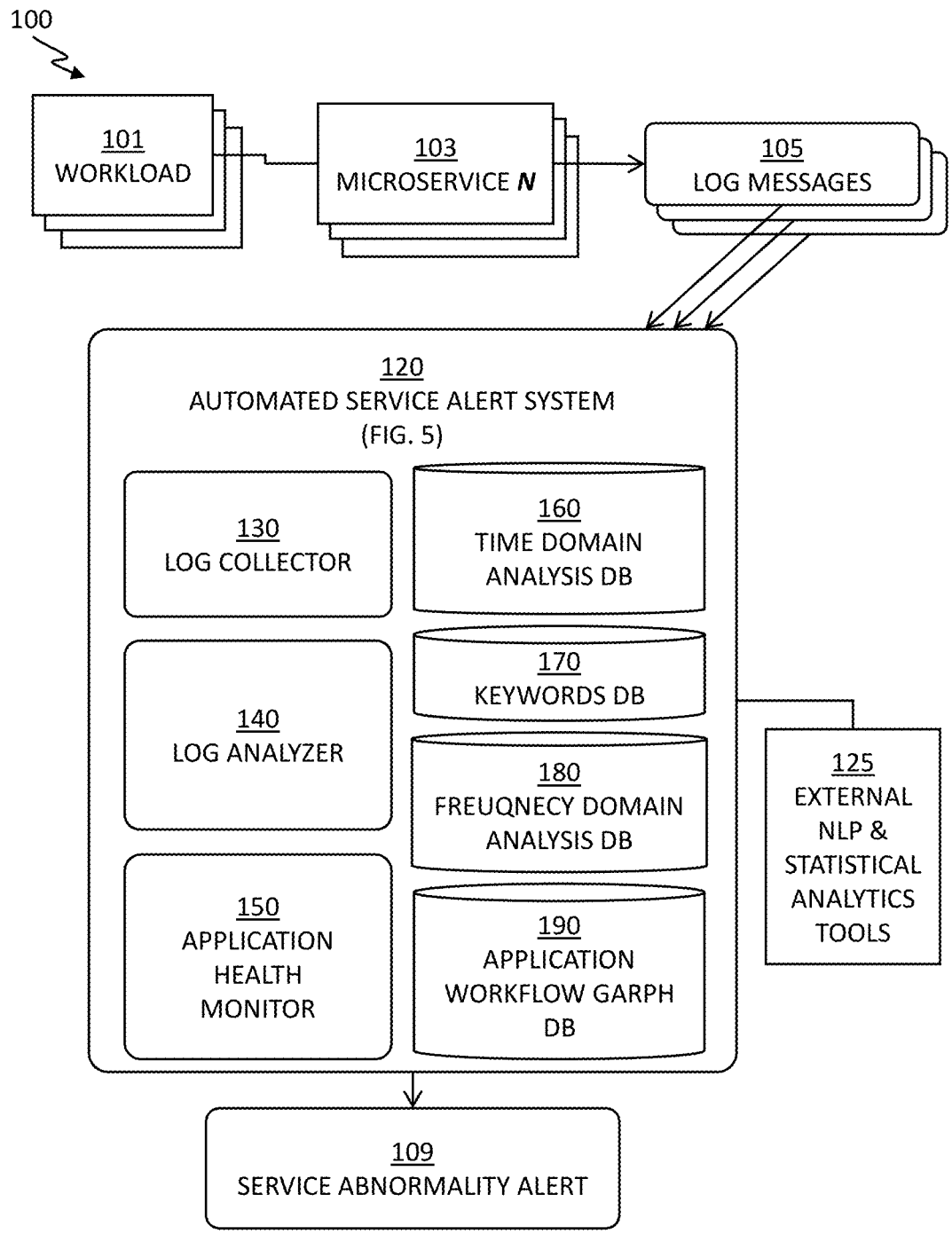
FIG. 1 depicts a system for automatically alerting service abnormalities based on a statistical pattern of keywords in log messages, in accordance with one or more embodiments set forth herein.

FIG. 1 depicts a system 100 for automatically alerting service abnormalities based on a statistical pattern of keywords in log messages, in accordance with one or more embodiments set forth herein Issues in health monitoring of operations in a microservice-based service architecture were noted above. Because of the complexity in interactions amongst a plurality of microservices running concurrently and asynchronously to process respective workloads, according to a logical flow set for a certain combination of microservices, the microservice-based service architecture cannot practically utilize pre-defined error codes or failure keywords programmed into applications inserted into application programs. Instead, respective microservices generate log messages arbitrarily designed by developers of the microservices, but the volume of log messages generated over a course of processing certain workloads is too great to readily identify and resolve any issues with the operations of the microservices. Further, respective formats and meanings of the log messages need to be learned and the log messages should be interpreted to locate issues reported in the log messages to use the log messages for troubleshooting the issues of the microservices.

The system 100 includes an automated service alert system 120 that collects a plurality of logs generated by a plurality of microservices while processing a plurality of workloads. A workload 101 amongst the plurality of workloads is for a microservice-based application architecture that processes the workload 101 by use of the plurality of microservices including a microservice N 103, where N indicates a positive integer that may represent an index number for each microservice. While the microservice N 103 processes a portion of the workload 101, the microservice N 103 or a group of microservices including the microservice N 103 can be repeated numerously in a particular order. The microservice N 103 would generate a plurality of log messages 105 while processing the workload 101. In this specification, the microservice N 103 refers to any singular microservice or a group of microservices that generate the log messages 105; and the log messages 105 can be identified with an originating microservice, which is the microservice N 103.

The automated service alert system 120 automatically produces a service abnormality alert 109 based on the log messages 105 by developing a statistical pattern of keywords in the log messages 105 generated by successfully completed workloads in the past and then detecting any deviating pattern of keywords in the log messages 105 in a particular workload that is being monitored. The automated service alert system 120 may output the service abnormality alert 109 to an administrative console interface or a certain system location designated for monitoring and debugging. The automated service alert system 120 may also send the service abnormality alert 109 out to a predefined list of recipients including an administrator of a platform running the microservice-based service architecture, a manager of the workload 101, or a program administrator of an application processing the workload 101 with the microservices including the microservice N 103, via any communication channel coupling the automated service alert system 120 to the recipients such as the Internet, local area networks (LANs) in wired and/or wireless forms, public telecommunication networks, mobile telecommunication networks, e-mail servers, and any other private or public virtual networks. The automated service alert system 120 includes a log collector 130, a log analyzer 140, and an application health monitor 150.

The log collector 130 of the automated service alert system 120 collects the log messages 105 from various sources where the microservices including the microservice N 103 write system logs during operation such as system log directory, log storage area for the workload 101 and/or the respective microservices, memory dump or storage area set aside for logs by the application, based on the respective log configurations of the microservices. An operating system of a computing platform running the microservice-based service architecture, the microservice-based service architecture, the application running on the microservice-based service architecture, or the individual microservices themselves can configure where the log messages 105 would be recorded. The log collector 130 then transforms the log messages 105 into time domain analysis (TDA) graph data and prepares the log messages 105 for the log analyzer 140 by, for example, extracting clean text from the log messages 105.

A TDA DB 160 of the automated service alert system 120 stores the TDA graph data generated by the log collector 130. The TDA graph data represents a workflow of the microservices that generated the log messages 105 on x-axis according to a time progression and, on y-axis, how many times respective microservices that generated the log messages 105 had been iterated. In this specification, terms "a number of iterations/runs/occurrences", or simply "runs/iterations/occurrences", "an iteration count", "a count", or "a frequency" of a particular microservice indicates how many times this microservice, by way of keyword patterns in the log messages, had been performed as represented by the log messages in a course of processing a workload. An exemplary workflow and a TDA graph data corresponding thereto are presented in FIG. 2 and corresponding description.

The application health monitor 150 initially defines and configures aspects of application monitoring, including, but not limited to, which microservices of an application to monitor by collecting and processing the log messages 105, what are the time windows subject to a certain type of frequency analysis for the microservices at issue, and a selected set of keywords corresponding to a particular level of attention necessary to attain a certain level of monitoring desired for the service abnormality alert 109. The application health monitor 150 builds application workflow graphs based on contents of the TDA DB 160, the keywords DB 170, and the FDA DB 180 and stores the application workflow graphs data in an application workflow graph DB 190.

The application health monitor 150 performs monitoring of another workload based on previously prepared statistical patterns in keywords and operations of the microservices in processing certain similar workloads that had been previously completed successfully and of which statistical patterns in keywords and frequencies of the respective microservice are stored in the TDA DB 160, the keywords DB 170, the FDA DB 180, and the application workflow graph DB 190. The application health monitor 150 is configured with a threshold for a deviation for logs generated by a currently monitored workload from the statistical pattern of the logs as stored in the TDA DB 160, the keywords DB 170, the FDA DB 180, and the application workflow graph DB 190. When the application health monitor 150 detects the deviation for the logs generated by the currently monitored workload that is greater than the threshold, then the application health monitor 150 identifies any issue related with the deviation greater than the threshold, generates the service abnormality alert 109, and delivers the service abnormality alert 109 to predefined recipients via certain predefined interface/communication channel to thereby enlighten the predefined recipients on how to address the issue causing the service abnormality represented in the deviation in the log messages. When the application health monitor 150 determines that the deviation for the logs generated by the currently monitored workload is within the threshold, then the application health monitor 150 provides feedback to the log analyzer 140 to update the keywords DB 170 and the FDA DB 180 with the logs generated by the currently monitored workload.

The log analyzer 140 extracts keyword patterns and stores the keyword patterns in a keywords DB 170 based on the clean texts of the log messages 105 as prepared by the log collector 130 and the TDA graph data stored in the TDA DB 160. The log analyzer 140 performs a frequency domain analysis on the keyword patterns in the keywords DB 170 and stores the result in a frequency domain analysis (FDA)

DB 180. Upon receiving a notification from the application health monitor 150 to update a certain statistically deviating keyword patterns and iterations within the threshold, the log analyzer 140 updates the keywords DB 170 and the FDA DB 180 with the logs generated by the currently monitored workload. The update of the keywords DB 170 and the FDA DB 180 may propagate backward to the TDA DB 160 and forward to the application workflow graph DB 190. An exemplary instance of an FDA is presented in FIG. 3 and corresponding description.

The automated service alert system 120 is operatively coupled to various natural language processing (NLP) tools and statistical analytics tools 125 that are external to the automated service alert system 120. The NLP tools and statistical analytics tools 125 are currently available in many computing platforms. The automated service alert system 120 controls, however, how the NLP tools and statistical analytics tools 125 are used based on operative parameters and configurations, in accordance with the provisions of the respective tools. For example, the log collector 130 extracting the clean text from the log messages 105 would employ the external NLP tools and generating the TDA graph data for the TDA DB 160 would employ the statistical analytics tools 125, based on configurations of the application health monitor 150, in accordance with embodiments of the present invention.

The automated service alert system 120 works effectively in monitoring repetitive processing of similar workloads with consistent input data such as metric data generated by data centers. An example of repetitive jobs with similar workloads may be a periodic cron job, indicating a job scheduler on Unix-type operating systems. Cron jobs are used to schedule jobs as a certain series of commands often written in shell scripts to run periodically at fixed times, dates, or intervals. The automated service alert system 120 provides a visual confirmation by TDA graphs or FDA graphs on issues of an unusual behavior of a certain workload and/or functional block where typical workloads have an established behavior without much variance.

The automated service alert system 120 facilitates instantaneous issue spotting on workloads without having to read through the log messages or without a significant level of knowledge on inner workings of the workflow and microservices therein in processing the workloads that generate the log messages. As noted, the number of log messages generated by even a single workload is too great to read through without any error let alone analyzing the log messages for issues. The automated service alert system 120 enables locating issues almost instantaneously as the workload is being processed, based on the log message keyword patterns and frequencies thereof.

The automated service alert system 120 is robust to the extent that the automated service alert system 120 can identify any problem spot based on a lack of supposed log messages or deviations in established patterns even the functional block in the workflow has not been completed in which all conventional troubleshooting mechanism based on embedded codes or keywords would fail to provide any insight on a problem location. The automated service alert system 120 does not require any changes to the microservices of the workflow to embed any special keywords or error codes in functional blocks as in conventional performance monitoring and debugging. But the automated service alert system 120 can adapt any tolerable changes in keyword patterns and frequencies within the predefined threshold by simply updating the keywords DB 170 and the FDA DB 180 based on a new pattern demonstrating such changes.

Figure 2:
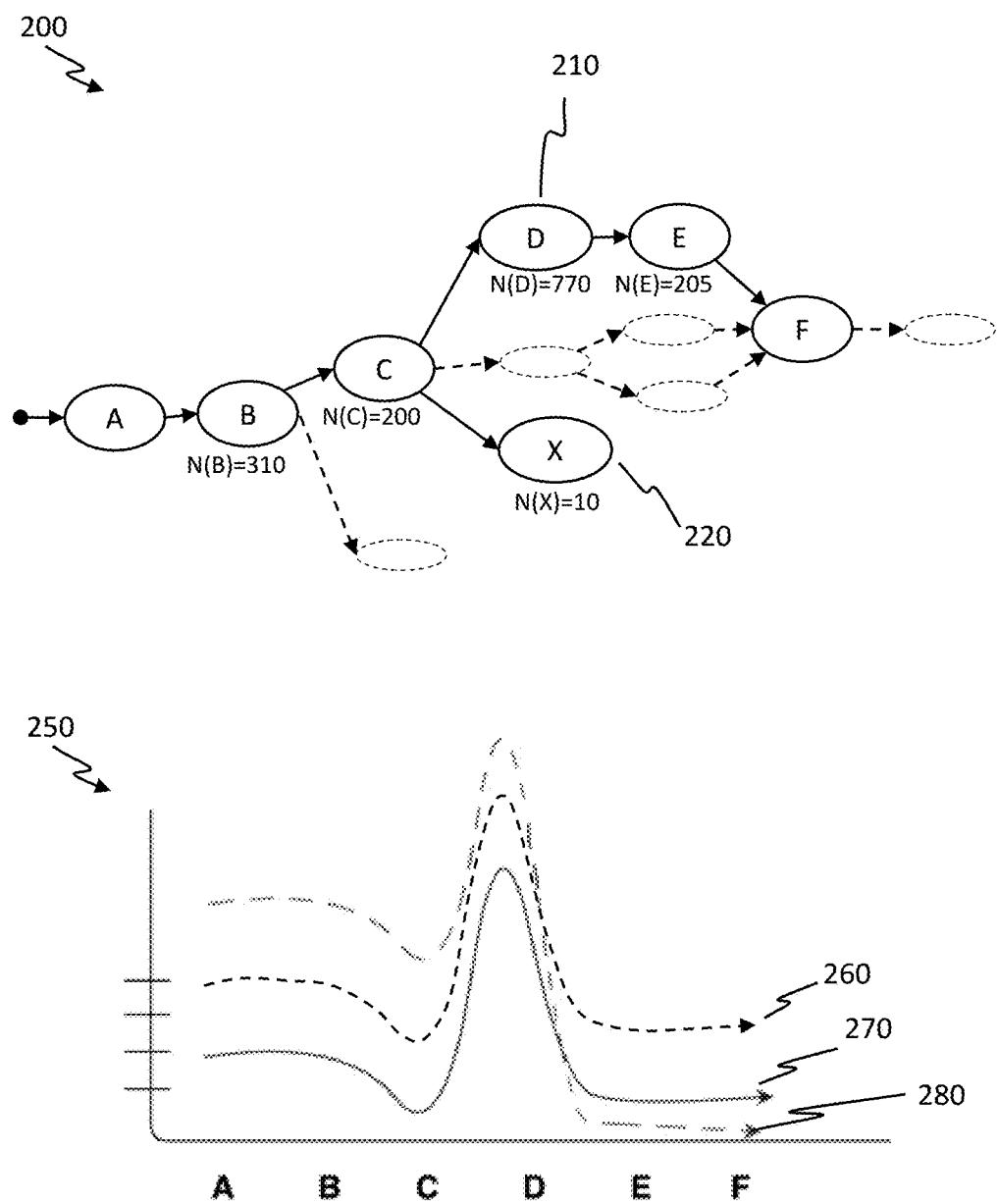
FIG. 2 depicts an exemplary workflow stored in the application workflow graph database of FIG. 1 and an exemplary TDA graph stored in the TDA DB of FIG. 1, in accordance with one or more embodiments set forth herein.

FIG. 2 depicts an exemplary workflow 200 of the workload 101 of FIG. 1 and an exemplary TDA graph 250 stored in the TDA DB 160 of FIG. 1, in accordance with one or more embodiments set forth herein.

As noted, the log collector 130 processes the log messages 105 while performing the workload 101 by use of a series of microservices including the microservice N 103. In the exemplary workflow 200 of the workload 101, each of lettered nodes A, B, C, D, E, F, and X in the exemplary workflow 200 corresponds to respective microservices. Dotted nodes with no letters indicate additional microservices in the exemplary workflow 200 that had not been configured for monitoring by the automated service alert system 120 via the application health monitor 150.

For the exemplary workflow 200, A node microservice indicates an authentication function, B node microservice indicates a input data preparation function, C node microservice indicates a data analysis function, D node microservice 210 indicates an additional data fetch function, E node microservice indicates an output data generation function, and F node microservice indicates a post processing of all data for a next round. X node microservice 220 indicates another additional data fetch function from another source. In the exemplary workflow 200 for the workload 101, B node microservice has been iterated three hundred and ten times, denoted as N(B)=310. Similarly, C node microservice has been iterated two hundred times, denoted as N(C)=200, D node microservice 210 has been iterated seven hundred and seventy times, denoted as N(D)=770, and E node microservice has been iterated two hundred and five times, denoted as N(E)=205.

While processing and monitoring another workload based on the iteration counts of the respective microservices established from previous workloads, X node microservice 220 iterated ten times, denoted as N(X)=10, in place of D node microprocess 210 of which frequency has been seven hundred and seventy, N(D)=770. Where a threshold is configured to one hundred (TH=100), because the frequency of X node microservice 220 (N(X)=10) statistically deviates more than the threshold from the frequency of D node microprocess 210 (N(D)=770), the application health monitor 150 identifies X node microservice 220 in place of D node microservice 210 in the exemplary workflow 200 as a service abnormality and generates the service abnormality alert 109 and communicates to a preselected recipients.

The log collector 130 generates the exemplary TDA graphs 250 based on running a first workload, a second workload, and a third workload, respectively represented by a first TDA graph 260 with a short-dashed curve, a second TDA graph 270 with a solid curve, and a third TDA graph 280 with a long-dashed curve, following the exemplary workflow 200. The three workloads respectively represented by the three TDA graphs 260, 270, and 280 generate respective log messages to analyze for monitoring health of the operations by the exemplary workflow 200.

The x-axis of the exemplary TDA graphs 250 represents the respective lettered microservices A, B, C, D, E, and F, in order of time progression in the exemplary workflow 200. The y-axis of the exemplary TDA graphs 250 indicates respective frequencies, that is, iteration counts, of the respective lettered microservices A, B, C, D, E, and F, in each workload represented by the three (3) TDA graphs 260, 270, and 280. The first TDA graph 260 and the second TDA graph 270 show a similar curve, indicating that the first workload and the second workload had run similarly. The log collector 130 will store both the first TDA graph 260 and the second TDA graph 270 in the TDA DB 160. For the third workload, however, the third TDA graph 280 does not perform D node microservice in a pattern similar to the first TDA graph 260 and the second TDA graph 270 at all with a significantly less frequency. Presuming that the threshold is less than the deviation in the frequency of the third workload at a time point same as D node microservice of the first and the second workloads, the application health monitor 150 will generate the service abnormality alert 109 to report X node microservice for the third workload in place of D node microservice in the first and the second workloads as an issue with the third workload for troubleshooting.

Figure 3:
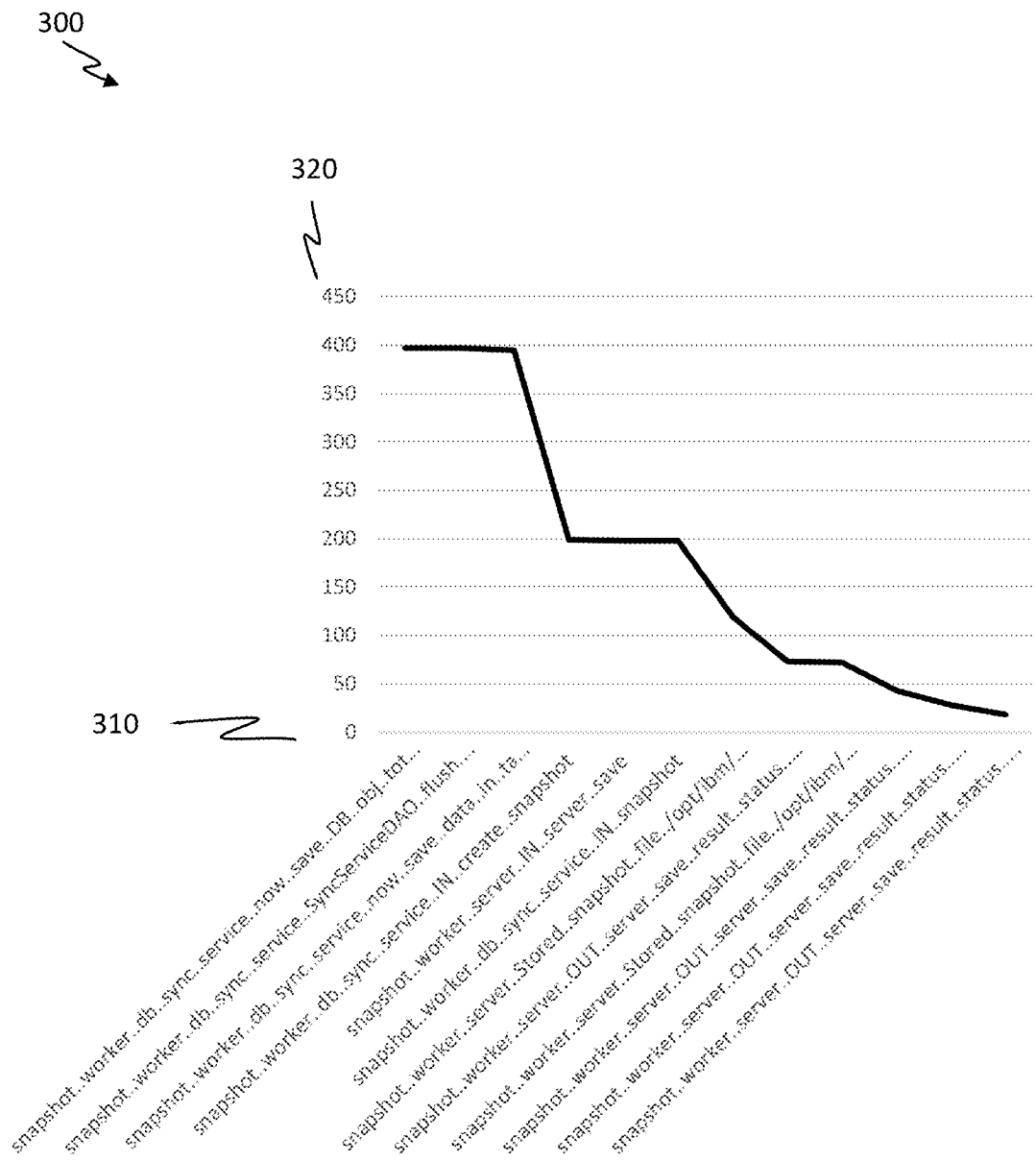
FIG. 3 depicts an exemplary FDA graph stored in the FDA DB 180 of FIG. 1, in accordance with one or more embodiments set forth herein.

FIG. 3 depicts an exemplary FDA graph 300 stored in the FDA DB 180 of FIG. 1, in accordance with one or more embodiments set forth herein.

The exemplary FDA graph 300 is an instance of the FDA DB 180 that shows a selection including twelve (12) most frequently used keyword patterns that appeared in the log messages of a certain workload.

The x-axis 310 of the exemplary FDA graph 300 shows the twelve most frequently used keyword patterns in previous workloads in order of respective frequencies from the beginning of the x-axis 310. The keyword patterns shown in the exemplary FDA graph 300 are stored in the keywords DB 170 as the log analyzer 140 completes the frequency domain analysis of the keywords appearing in the clean text of the log messages 105, as prepared by the log collector 130.

Three examples of the log messages 105 may be as below:
[2019-10-24 01:20:22]config_sync[29026:recv_msg: snapshot_repository:73]INFO self.snapshot_info is {u'url': u'https://146.89.131.167:9081/snapshot/save', u'username': u'nsoadmin-1', u'class_path': u'service.processor.snapshot_repository.SnapshotRepository', u'password': u'password'}
[2019-10-24 01:20:22]config_sync[29026:recv_msg: rest_client:102]DEBUG enter RESTClient POST function
[2019-10-24 01:20:24]config_sync[29026:recv_msg: snapshot_repository:78]DEBUG result={"status_code": 200, "message": "Snapshot saved", "metadata": {"status": "ACTIVE", "snap_time": "2019-10-24 01:20:22.933203", "task_id": "VPN-A", "updatedtime": "2019-10-24 05:20:24.130463", "device_command": "show configuration security|display xml\r\nshow configuration interfaces|display xml\r\nshow configuration routing-instances|display xml", "site_id": "HRT", "device_name": "brhoqfw130dcpfa", "path": "/opt/ibm/nso/service/snapshot_repository/repo/4dd41abc-9818-4134-a9af-9b7b82bf525b", "createdtime": "2019-10-24 05:20:24.117556", "service_id": "VPN_HRT", "id": "4dd41abc-9818-4134-a9af-9b7b82bf525b"}}

As noted, the number of the log messages 105 are up to in order of thousands for regular workloads and it is impractical to review all log messages 105 regularly but it is almost impossible to find any issue on a certain microservice when an issue had occurred by going through the tens of thousands of raw log messages.

The log collector 130 produces clean texts from the log messages 105 by removing timestamps, numbers, certain special characters, or words without inherent meanings such as particles and pronouns. The keyword patterns of the exemplary FDA graph 300 mostly includes a command, description for actions and states, directory paths, names of system objects and parameters, etc. Each of the keyword patterns of the exemplary FDA graph 300 also is an ordered sequence of keywords linked by a mathematical range symbol, that is, '. .', between two keywords. The keyword patterns of the exemplary FDA graph 300 may be longer than the keyword patterns shown in the exemplary FDA graph 300, where the keyword patterns on x-axis 310 end with respective ellipses, that is, In one embodiment of the log collector 130 produced the text for keywords as in the exemplary FDA graph 300, a special character of forward slash ('/') has not been removed during the preparation because a presence of a forward slash or a lack thereof in directory paths would have distinctive meanings.

The y-axis 320 of the exemplary FDA graph 300 shows respective frequencies, or the number of appearances in the log messages 105 of each keyword pattern on the x-axis 310.

Figure 4:
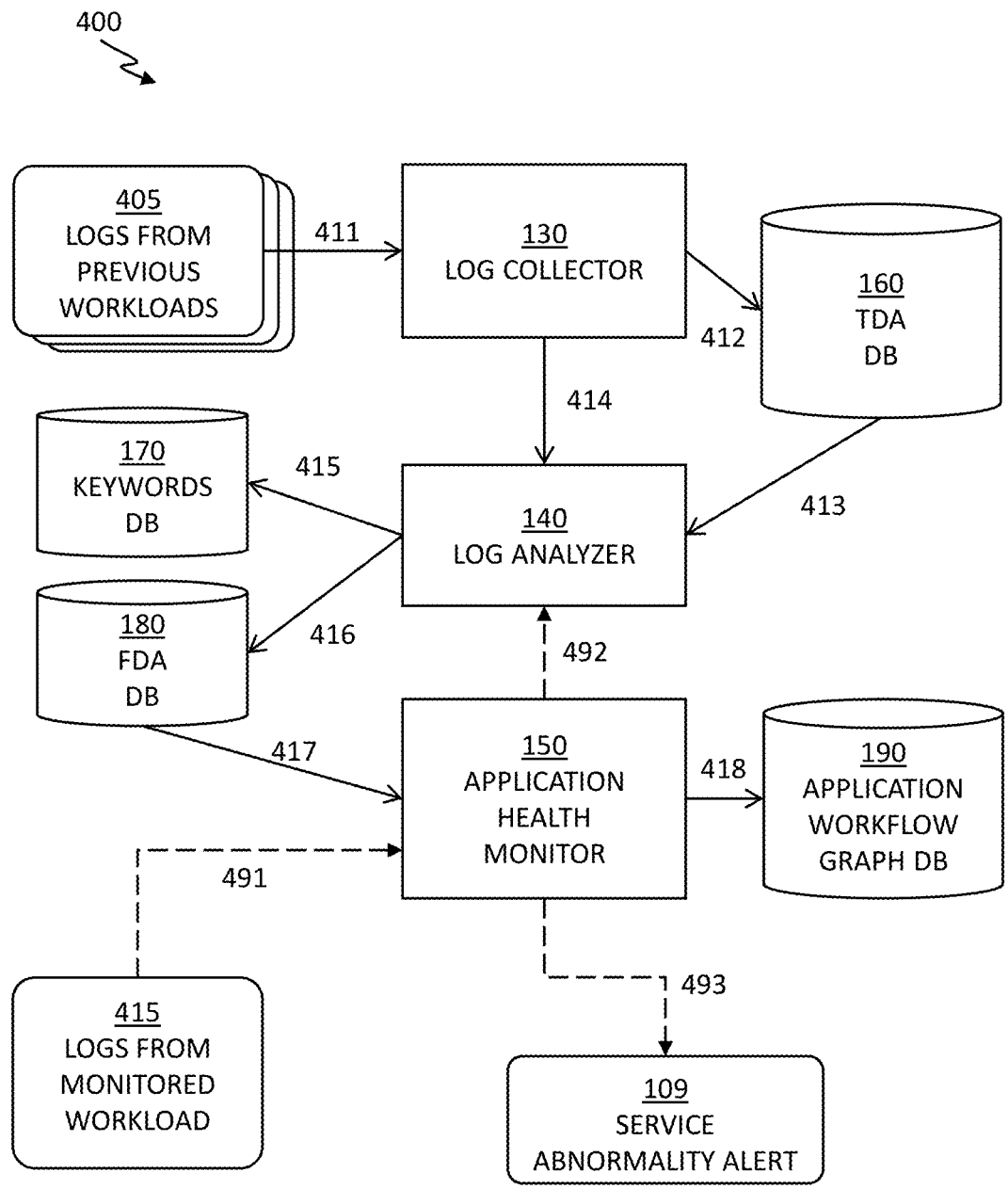
FIG. 4 depicts a flow of data amongst components of the automated service alert system of FIG. 1, in accordance with one or more embodiments set forth herein.

FIG. 4 depicts a dataflow 400 amongst components of the automated service alert system 120 of FIG. 1, in accordance with one or more embodiments set forth herein.

The dataflow 400 describes operations of the automated service alert system 120 in two-phases in certain embodiments of the present invention. In a first phase, the automated service alert system 120 builds the TDA DB 160, the keywords DB 170, the FDA DB 180, and the application workflow graph DB 190, on behaviors of previously completed workloads based on inputs of logs from previous workloads 405. In the first phase, the logs from previous workloads 405 were input to the log collector 130, indicated by arrow 411. The log collector 130 processes the logs from previous workloads 405 and stores resulting the TDA graph data to the TDA DB 160, indicated by arrow 412. The log analyzer 140 uses the TDA graph data from the TDA DB 160 as inputs, indicated by arrow 413. The log analyzer 140 also takes log texts processed by the log collector 130 as inputs, indicated by arrow 414. The log analyzer 140 processes combined inputs from the log collector 130 and the TDA DB 160 and builds the keywords DB 170 and the FDA DB 180, indicated by arrows 415 and 416, respectively. The application health monitor 150 takes inputs from the keywords DB 170 and the FDA DB 180, indicated by arrow 417, and builds the application workflow graph DB 190, indicated by arrow 418, by processing the frequency domain analysis data and the keyword patterns. At the conclusion of the first phase, the automated service alert system 120 establishes a statistical pattern of behaviors of successfully completed workloads as being represented in the logs from previous workloads 405.

In certain embodiments of the present invention, the automated service alert system 120 may begin building the TDA DB 160, the keywords DB 170, the FDA DB 180, and the application workflow graph DB 190 with, for example, any predefined number of previous workloads in the first phase. In the same embodiment of the present invention as above, the statistical pattern of behaviors by workloads represented in the TDA DB 160, the keywords DB 170, the FDA DB 180, and the application workflow graph DB 190 can be used to monitor another workload once the TDA DB 160, the keywords DB 170, the FDA DB 180, and the application workflow graph DB 190 are populated as the operations of the automated service alert system 120 will adjust the statistical pattern stored in the TDA DB 160, the keywords DB 170, the FDA DB 180, and the application workflow graph DB 190 as shown in a second phase.

In the second phase, the automated service alert system 120 monitors another workload that is currently being processed by comparing the logs from the monitored workload 415 against the statistical pattern of successful previous workloads based on the TDA DB 160, the keywords DB 170, the FDA DB 180, and the application workflow graph DB 190 established in the first phase. The application health monitor 150 takes inputs of the logs from the monitored workload 415, as indicated by dashed arrow 491. The logs from the monitored workload 415 may be processed for clean texts and keyword extraction by the log collector 130 in implementation but the data from the logs from the monitored workload 415 would not yet be reflected into the TDA DB 160, the keywords DB 170, the FDA DB 180, and the application workflow graph DB 190.

If the logs from the monitored workload 415 is within a range set by the threshold from the statistical pattern represented in the TDA DB 160, the keywords DB 170, the FDA DB 180, and the application workflow graph DB 190, then the application health monitor 150 will feedback the log analyzer 140 or any other components of the automated service alert system 120, as representatively indicated by dashed arrow 492, to update the TDA DB 160, the keywords DB 170, the FDA DB 180, and the application workflow graph DB 190 with newly compiled data from the logs from the monitored workload 415. Updating the TDA DB 160, the keywords DB 170, the FDA DB 180, and the application workflow graph DB 190 would establish a new statistical pattern inclusive of behaviors represented in the logs from the monitored workload 415.

If the logs from the monitored workload 415 is outside of the range set by the threshold from the statistical pattern represented in the databases 160, 170, 180, and 190, then the application health monitor 150 determines that the monitored workload behaves abnormally and generates the service abnormality alert 109 and reports to predefined recipients, as indicated by dashed arrow 493.

Figure 5:
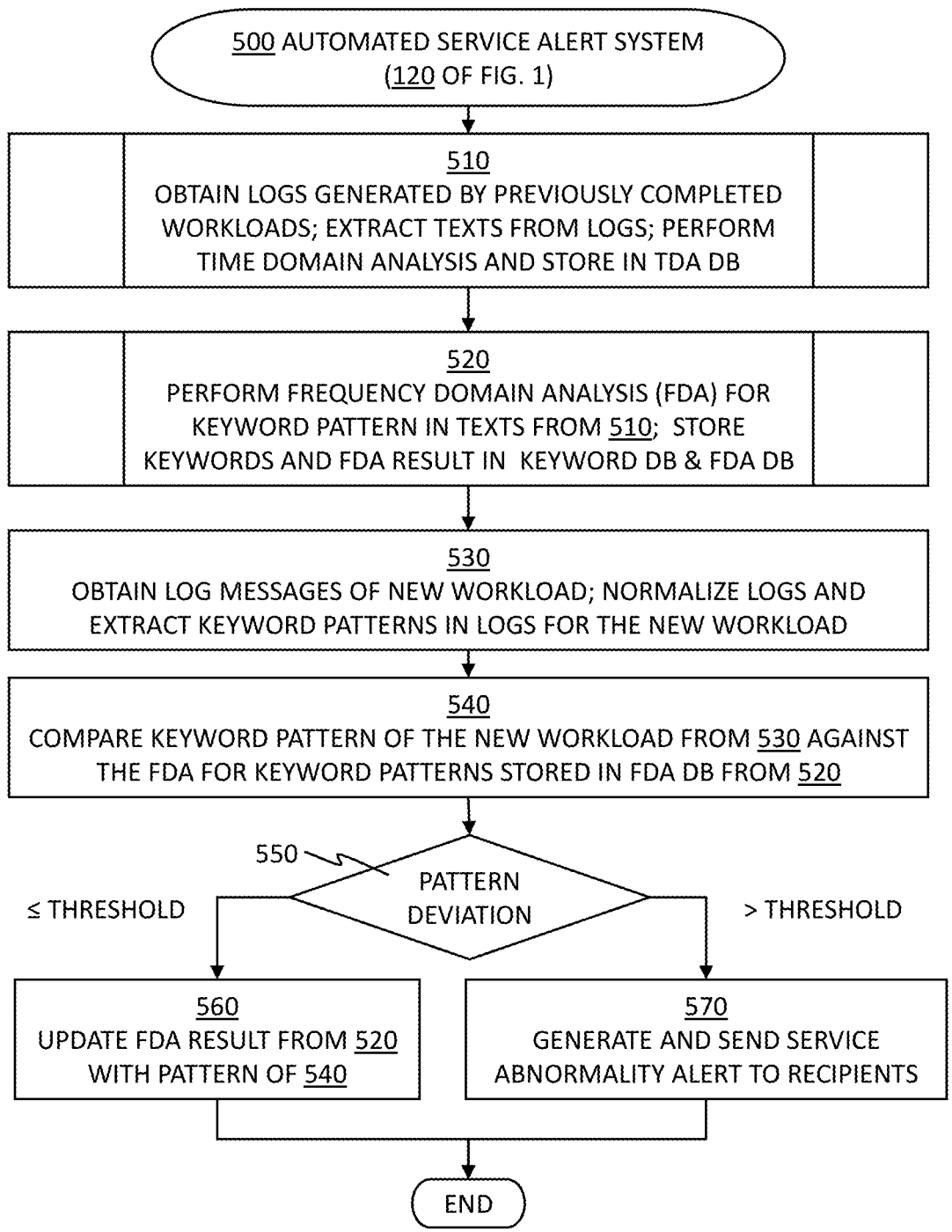
FIG. 5 depicts a flowchart of operations performed by the automated service alert system of FIG. 1, in accordance with one or more embodiments set forth herein.

FIG. 5 depicts a flowchart 500 of operations performed by the automated service alert system 120 of FIG. 1, in accordance with one or more embodiments set forth herein.

In block 510, the automated service alert system 120 obtains the logs from previously completed workloads from various sources according to system output configuration for the operating system and/or any directories set for diagnostic outputs as being specified by the workload or the application. The automated service alert system 120 extracts clean texts from the logs by removing timestamps, numbers, filler words, and certain special characters in each log message. The automated service alert system 120 performs time domain analysis of the workloads to determine which microservices were performed in which order and how many times, to process the workloads. The automated service alert system 120 stores the result of the time domain analysis in the TDA DB 160. Then, the automated service alert system 120 proceeds with block 520.

In certain embodiments of the present invention, block 510 of the automated service alert system 120 is implemented by the log collector 130 in the first phase described in the dataflow of FIG. 4. The contents of the TDA DB 160 are subsequently made available to any other components in the automated service alert system 120, without explicit restrictions.

In block 520, the automated service alert system 120 perform frequency domain analysis for keyword patterns represented in the clean texts from block 510. The automated service alert system 120 generates a list of keyword patterns appearing in the log messages and sort the keyword patterns according to the respective frequencies of the keyword patterns. The automated service alert system 120 stores the keyword patterns in the keywords DB 170 and the FDA results in the FDA DB 180. Then, the automated service alert system 120 proceeds with block 530.

In certain embodiments of the present invention, the automated service alert system 120 implements the frequency domain analysis incrementally, by creating a list of single keywords, a list of two keywords combinations, and a list of three keywords combinations, in order. The automated service alert system 120 then filters each of the log messages with the list of three keywords combination such that any log message including at least one three-word combination would be selected for the FDA DB 180. The automated service alert system 120 sorts the log messages in order of frequencies, that is, how many times the log message has appeared during the course of processing the workload.

In certain embodiments of the present invention, block 520 of the automated service alert system 120 is implemented by the log analyzer 140 in the first phase described in the dataflow of FIG. 4. The contents of the keywords DB 170 and the FDA DB 180 are subsequently made available to any other components in the automated service alert system 120, without explicit restrictions.

Blocks 530 through 570 represent the second phase of the dataflow 400 shown in FIG. 4. In certain embodiments of the present invention, the application health monitor 150 performs blocks 530 through 570 in combination with a text normalization function for the logs as used in the log collector 130 and the frequency domain analysis function for updating the FDA DB 180 used in the log analyzer 140. In certain embodiments, the automated service alert system 120 includes a module for text normalization separate from the log collector 130 or calls up the NLP tool that is customarily configured for text normalization for the logs.

In block 530, the automated service alert system 120 obtains log messages of a new workload that is subject to monitoring by the automated service alert system 120. The automated service alert system 120 normalizes the logs for clean texts and extract keyword patterns appearing in the logs for the new workload. Then, the automated service alert system 120 proceeds with block 540.

In block 540, the automated service alert system 120 compares the keyword pattern of the logs by the new workload from block 530 against the FDA for the keyword patterns stored in the FDA DB 180 as prepared in block 520. Then, the automated service alert system 120 proceeds with block 550.

In block 550, the automated service alert system 120 determines whether or not a deviation of the keyword pattern of the logs by the new workload from the keyword pattern for the previous workloads as stored in the FDA DB 180 is within a predefined threshold. If the automated service alert system 120 determines that the deviation of the keyword pattern of the logs by the new workload from the keyword pattern stored in the FDA DB 180 is within the predefined threshold, then, the automated service alert system 120 proceeds with block 560. If the automated service alert system 120 determines that the deviation of the keyword pattern of the logs by the new workload from the keyword pattern stored in the FDA DB 180 is greater than the predefined threshold, then, the automated service alert system 120 proceeds with block 570.

In certain embodiments of the present invention, the predefined threshold of block 550 is set based on the characteristics of the workloads and the application. For example, if the keyword pattern for the logs by the new workload might be different from the keyword pattern for the logs by the previous workloads as stored in the FDA DB 180 with known reasons such as alternative directory paths or otherwise incidental to a successful completion of the new workload, then the automated service alert system 120 configures the threshold high enough not to generate the service abnormality alert 109 on the new workload.

In block 560, the automated service alert system 120 updates the FDA DB 180 with any changes in the keyword pattern of the logs by the new workload from block 540 as the changes in the keyword pattern by the new workload is within the threshold and any deviation within the threshold can be used to establish a new statistical pattern for monitoring future workloads. Then, the automated service alert system 120 terminates or loops back to block 530 to monitor another workload.

In certain embodiments of the present invention, the automated service alert system 120 may find the keyword pattern of the logs by the new workload matches exactly with the keyword pattern in the FDA DB 180 in block 550. Although still within the threshold, if the automated service alert system 120 determines that the keyword pattern of the logs by the new workload matches the keyword pattern in the FDA DB 180 exactly with no deviation at all, then the automated service alert system 120 updates only a number of workloads sampled in the keyword patterns in the FDA DB 180 but does not update the keyword patterns in the FDA DB 180 as being identical.

In block 570, the automated service alert system 120 generates and delivers the service abnormality alert 109 to predefined recipients. The deviation in the keyword patterns by the new workload from the previous workloads specify which log message has been disrupted and thus, the automated service alert system 120 can identify where in the workflow for the new workload has caused the issue by a functional block or a microservice. The automated service alert system 120 includes location information of the issues within the workflow of the new workload in generating the service abnormality alert 109. Then, the automated service alert system 120 terminates or loops back to block 530 to monitor another workload.

Certain embodiments of the present invention automate alerting any service abnormalities based on patterns of keywords in logs generated while processing a workload. Certain embodiments of the present invention automatically generate a service abnormality alert without changing program codes of application that process the workload to embed error codes or location index for abnormality monitoring. Certain embodiments of the present invention instantaneously locate a problem location based on a deviation in a keyword pattern of logs generated by a monitored workload and a keyword pattern represented in logs established by successfully performed workloads in the past. Certain embodiments of the present invention monitor and alert system abnormalities even if the workload fails to provide logs due to a stoppage in processing the workload. Certain embodiments of the present invention automatically adapt to a new keyword pattern that deviates from an established statistical pattern of keywords within a certain configurable threshold by updating the statistical pattern of keywords to include the new keyword pattern. Certain embodiments of the present invention may be implemented by use of a cloud platform/data center/server farm in various types including a Software-as-a-Service (SaaS), Platform-as-a-Service (PaaS), Database-as-a-Service (DBaaS), and combinations thereof. The automated service alert system can be offered for and delivered to any service providers/business entities/vendors and developers of software applications from any location in the world in need of efficient monitoring of workload processing as in data centers.

Embodiments of the present invention present a computer implemented method including, for instance: collecting, by one or more processor, a plurality of log messages generated while processing two or more workloads that had been successfully completed by an application, where a plurality of microservices of the application collectively generates the log messages; performing, by the one or more processor, a time domain analysis on the microservices for respective iteration counts of the microservices of the application, and building a time domain analysis database with a result of the time domain analysis; extracting, by the one or more processor, keyword patterns frequently used in the log messages by the microservices from collecting, and building a keywords database with the keyword patterns; performing, by the one or more processor, a frequency domain analysis on the keyword patterns for respective numbers of appearances in the log messages, and building a frequency domain analysis database with a result of the frequency domain analysis; obtaining, by the one or more processor, logs generated from a new workload for the application; determining, by the one or more processor, that the logs generated from the new workload has a deviation greater than a threshold set for the workloads for the application, based on comparing keyword patterns from the logs of the new workload against the keyword patterns in the frequency domain analysis database; and generating, by the one or more processor, an alert with a microservice originating an abnormality based on a specific keyword pattern corresponding to the deviation and delivering the alert to preselected recipients.

Embodiments of the present invention present a computer implemented method also including, for instance: building an application workflow graph database based on a combination of: an order of running the microservices while the application processes the two or more workloads and the keyword patterns for respective numbers of appearances in the log messages, as correlated by the iteration counts of the microservices and the numbers of appearances by the keyword patterns.

Embodiments of the present invention present a computer implemented method also including, for instance: prior to the determining, ascertaining that the deviation by the logs generated from the new workload is within the threshold set for the workloads for the application, based on comparing keyword patterns from the logs of the new workload against the keyword patterns in the frequency domain analysis database; and updating the frequency domain analysis database with the keyword patterns from the logs of the new workload to thereby adjust the keyword patterns in the frequency domain analysis database and looping back to the obtaining for monitoring another workload.

Embodiments of the present invention present a computer implemented method also including, for instance: prior to the determining, ascertaining that the deviation by the logs generated from the new workload is zero (0) indicating an exact match with the keyword patterns in the frequency domain analysis database; and adjusting counters related to a number of workload samples contributed to the frequency domain analysis database and looping back to the obtaining for monitoring another workload.

Embodiments of the present invention present a computer implemented method also including, for instance: the performing the frequency domain analysis including: creating a list of three-keyword combinations incrementally based on creating a single keyword list and a list of two-keyword combinations; filtering each of the log messages with the three-keyword combinations of the list from creating; and sorting the log messages comprising the three-keyword combination from the filtering in order of the numbers of appearances of the log messages.

Embodiments of the present invention present a computer implemented method also including, for instance: where each of the two-keyword combinations includes the most frequent keyword as compiled from the single keyword list, and where each of the three-keyword combinations includes the most frequent two-keyword combination as compiled from the list of two-keyword combinations.

Embodiments of the present invention present a computer implemented method also including, for instance: prior to the extracting the keyword patterns, preparing the log messages to leave clean text with information as to any location of the microservices respectively generating the log messages, by removing timestamps, numbers, and filler words, from the log messages but keeping any directory paths including special characters commonly used in the directory paths in the log messages.

Figure 6:
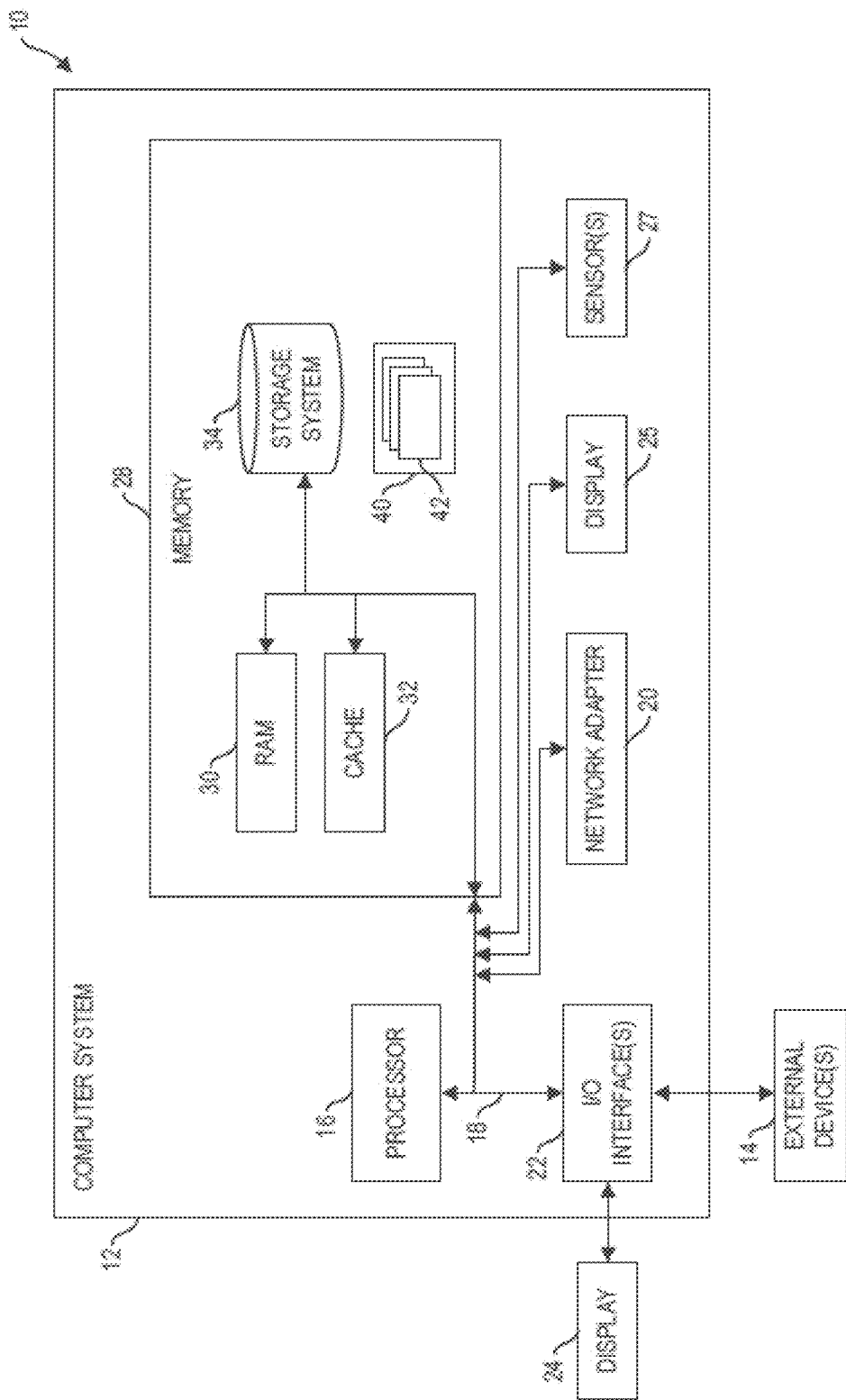
FIG. 6 depicts a cloud computing node according to an embodiment of the present invention.
Figure 7:
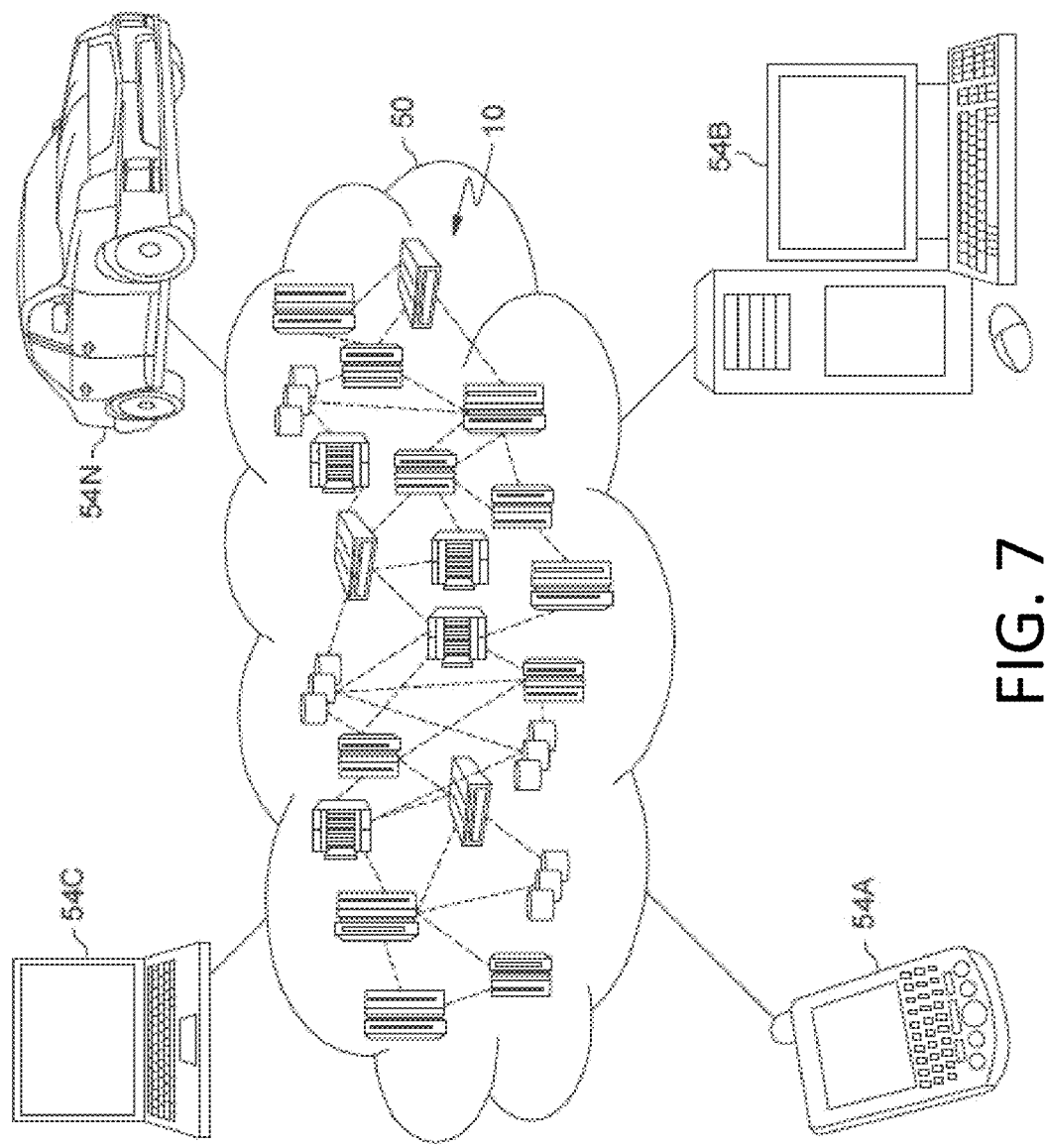
FIG. 7 depicts a cloud computing environment according to an embodiment of the present invention.
Figure 8:
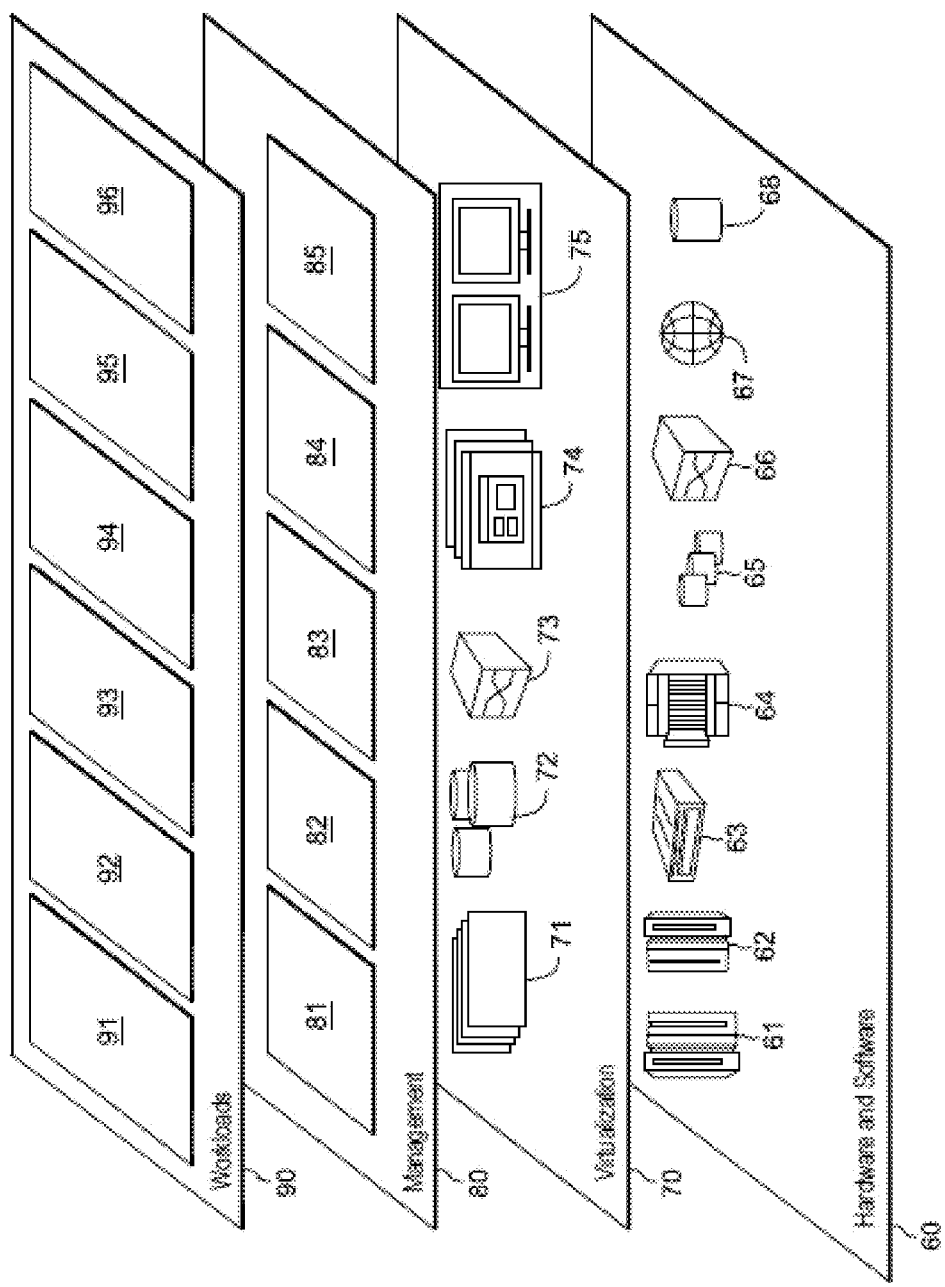
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the automated service alert system 120 of FIG. 1. Program processes 42, as in the automated service alert system 120, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 7, illustrative cloud computing environment 50 is depicted. As shown, cloud computing environment 50 includes one or more cloud computing nodes 10 running the automated service alert system 120 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for automated service alert system, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    collecting, by one or more processor, a plurality of log messages generated while processing two or more workloads that had been successfully completed by an application, wherein a plurality of microservices of the application collectively generates the log messages;
    performing, by the one or more processor, a time domain analysis on the microservices for respective iteration counts of the microservices of the application, and building a time domain analysis database with a result of the time domain analysis;
    extracting, by the one or more processor, keyword patterns frequently used in the log messages by the microservices from collecting, and building a keywords database with the keyword patterns;
    performing, by the one or more processor, a frequency domain analysis on the keyword patterns for respective numbers of appearances in the log messages, and building a frequency domain analysis database with a result of the frequency domain analysis;
    obtaining, by the one or more processor, logs generated from a new workload for the application;
    determining, by the one or more processor, that the logs generated from the new workload has a deviation greater than a threshold set for the workloads for the application, based on comparing keyword patterns from the logs of the new workload against the keyword patterns in the frequency domain analysis database; and
    generating, by the one or more processor, an alert with a microservice originating an abnormality based on a specific keyword pattern corresponding to the deviation and delivering the alert to preselected recipients.

2. The computer implemented method of claim 1, further comprising:
    building an application workflow graph database based on a combination of: an order of running the microservices while the application processes the two or more workloads and the keyword patterns for respective numbers of appearances in the log messages, as correlated by the iteration counts of the microservices and the numbers of appearances by the keyword patterns.

3. The computer implemented method of claim 1, further comprising:
    prior to the determining, ascertaining that the deviation by the logs generated from the new workload is within the threshold set for the workloads for the application, based on comparing keyword patterns from the logs of the new workload against the keyword patterns in the frequency domain analysis database; and updating the frequency domain analysis database with the keyword patterns from the logs of the new workload to thereby adjust the keyword patterns in the frequency domain analysis database and looping back to the obtaining for monitoring another workload.

4. The computer implemented method of claim 1, further comprising:

prior to the determining, ascertaining that the deviation by the logs generated from the new workload is zero (0) indicating an exact match with the keyword patterns in the frequency domain analysis database; and adjusting counters related to a number of workload samples contributed to the frequency domain analysis database and looping back to the obtaining for monitoring another workload.

5. The computer implemented method of claim 1, the performing the frequency domain analysis comprising:

creating a list of three-keyword combinations incrementally based on creating a single keyword list and a list of two-keyword combinations;

filtering each of the log messages with the three-keyword combinations of the list from creating; and sorting the log messages comprising the three-keyword combination from the filtering in order of the numbers of appearances of the log messages.

6. The computer implemented method of claim 5, wherein each of the two-keyword combinations comprises the most frequent keyword as compiled from the single keyword list, and wherein each of the three-keyword combinations comprises the most frequent two-keyword combination as compiled from the list of two-keyword combinations.

7. The computer implemented method of claim 1, further comprising:

prior to the extracting the keyword patterns, preparing the log messages to leave clean text with information as to any location of the microservices respectively generating the log messages, by removing timestamps, numbers, and filler words, from the log messages but keeping any directory paths including special characters commonly used in the directory paths in the log messages.

8. A computer program product comprising:

a computer readable storage medium readable by one or more processors and storing instructions for execution by the one or more processors for performing a method comprising:

collecting a plurality of log messages generated while processing two or more workloads that had been successfully completed by an application, wherein a plurality of microservices of the application collectively generates the log messages;

performing a time domain analysis on the microservices for respective iteration counts of the microservices of the application, and building a time domain analysis database with a result of the time domain analysis;

extracting keyword patterns frequently used in the log messages by the microservices from collecting, and building a keywords database with the keyword patterns;

performing a frequency domain analysis on the keyword patterns for respective numbers of appearances in the log messages, and building a frequency domain analysis database with a result of the frequency domain analysis;

obtaining logs generated from a new workload for the application;

determining that the logs generated from the new workload has a deviation greater than a threshold set for the workloads for the application, based on comparing keyword patterns from the logs of the new workload against the keyword patterns in the frequency domain analysis database; and generating an alert with a microservice originating an abnormality based on a specific keyword pattern corresponding to the deviation and delivering the alert to preselected recipients.

9. The computer program product of claim 8, further comprising:

building an application workflow graph database based on a combination of: an order of running the microservices while the application processes the two or more workloads and the keyword patterns for respective numbers of appearances in the log messages, as correlated by the iteration counts of the microservices and the numbers of appearances by the keyword patterns.

10. The computer program product of claim 8, further comprising:

prior to the determining, ascertaining that the deviation by the logs generated from the new workload is within the threshold set for the workloads for the application, based on comparing keyword patterns from the logs of the new workload against the keyword patterns in the frequency domain analysis database; and updating the frequency domain analysis database with the keyword patterns from the logs of the new workload to thereby adjust the keyword patterns in the frequency domain analysis database and looping back to the obtaining for monitoring another workload.

11. The computer program product of claim 8, further comprising:

prior to the determining, ascertaining that the deviation by the logs generated from the new workload is zero (0) indicating an exact match with the keyword patterns in the frequency domain analysis database; and adjusting counters related to a number of workload samples contributed to the frequency domain analysis database and looping back to the obtaining for monitoring another workload.

12. The computer program product of claim 8, the performing the frequency domain analysis comprising:

creating a list of three-keyword combinations incrementally based on creating a single keyword list and a list of two-keyword combinations;

filtering each of the log messages with the three-keyword combinations of the list from creating; and sorting the log messages comprising the three-keyword combination from the filtering in order of the numbers of appearances of the log messages.

13. The computer program product of claim 12, wherein each of the two-keyword combinations comprises the most frequent keyword as compiled from the single keyword list, and wherein each of the three-keyword combinations comprises the most frequent two-keyword combination as compiled from the list of two-keyword combinations.

14. The computer program product of claim 8, further comprising:

prior to the extracting the keyword patterns, preparing the log messages to leave clean text with information as to any location of the microservices respectively generating the log messages, by removing timestamps, numbers, and filler words, from the log messages but keeping any directory paths including special characters commonly used in the directory paths in the log messages.

15. A system comprising:

a memory;

one or more processors in communication with the memory; and program instructions executable by the one or more processors via the memory to perform a method comprising:

collecting a plurality of log messages generated while processing two or more workloads that had been successfully completed by an application, wherein a plurality of microservices of the application collectively generates the log messages;

performing a time domain analysis on the microservices for respective iteration counts of the microservices of the application, and building a time domain analysis database with a result of the time domain analysis;

extracting keyword patterns frequently used in the log messages by the microservices from collecting, and building a keywords database with the keyword patterns;

performing a frequency domain analysis on the keyword patterns for respective numbers of appearances in the log messages, and building a frequency domain analysis database with a result of the frequency domain analysis;

obtaining logs generated from a new workload for the application;

determining that the logs generated from the new workload has a deviation greater than a threshold set for the workloads for the application, based on comparing keyword patterns from the logs of the new workload against the keyword patterns in the frequency domain analysis database; and generating an alert with a microservice originating an abnormality based on a specific keyword pattern corresponding to the deviation and delivering the alert to preselected recipients.

16. The system of claim 15, further comprising:

building an application workflow graph database based on a combination of: an order of running the microservices while the application processes the two or more workloads and the keyword patterns for respective numbers of appearances in the log messages, as correlated by the iteration counts of the microservices and the numbers of appearances by the keyword patterns.

17. The system of claim 15, further comprising:

prior to the determining, ascertaining that the deviation by the logs generated from the new workload is within the threshold set for the workloads for the application, based on comparing keyword patterns from the logs of the new workload against the keyword patterns in the frequency domain analysis database; and updating the frequency domain analysis database with the keyword patterns from the logs of the new workload to thereby adjust the keyword patterns in the frequency domain analysis database and looping back to the obtaining for monitoring another workload.

18. The system of claim 15, further comprising:

prior to the determining, ascertaining that the deviation by the logs generated from the new workload is zero (0) indicating an exact match with the keyword patterns in the frequency domain analysis database; and adjusting counters related to a number of workload samples contributed to the frequency domain analysis database and looping back to the obtaining for monitoring another workload.

19. The system of claim 15, the performing the frequency domain analysis comprising:

creating a list of three-keyword combinations incrementally based on creating a single keyword list and a list of two-keyword combinations;

filtering each of the log messages with the three-keyword combinations of the list from creating; and sorting the log messages comprising the three-keyword combination from the filtering in order of the numbers of appearances of the log messages.

20. The system of claim 19, wherein each of the two-keyword combinations comprises the most frequent keyword as compiled from the single keyword list, and wherein each of the three-keyword combinations comprises the most frequent two-keyword combination as compiled from the list of two-keyword combinations.

* * * * *